United States Patent [19]

Kauffman et al.

[11] 4,193,957

[45] Mar. 18, 1980

[54] PROCESS FOR FORMING A SURFACE COVERING HAVING DECORATIVE EFFECTS

[75] Inventors: William J. Kauffman, Lancaster; George L. Lilley, Manheim, both of Pa.

[73] Assignee: Armstrong Cork Company, Lancaster, Pa.

[21] Appl. No.: 904,611

[22] Filed: May 10, 1978

Related U.S. Application Data

[63] Continuation-in-part of Ser. No. 820,864, Aug. 1, 1977, abandoned.

[51] Int. Cl.[2] .............................................. B29D 27/04

[52] U.S. Cl. ..................................... 264/46.4; 264/50; 264/52; 264/54; 264/321; 264/DIG. 5; 264/DIG. 60; 264/DIG. 82

[58] Field of Search .................. 264/321, 46.4, 50, 52, 264/DIG. 82, DIG. 60, 54, DIG. 5; 428/161, 183; 425/372

[56] References Cited

U.S. PATENT DOCUMENTS

| | | | |
|---|---|---|---|
| 3,196,030 | 7/1965 | Petry | 428/183 X |
| 3,655,312 | 4/1972 | Erb et al. | 425/372 X |
| 3,741,851 | 6/1973 | Erb et al. | 428/161 |
| 3,887,678 | 6/1975 | Lewicki | 264/321 X |

OTHER PUBLICATIONS

Flory, Paul J., "Principles of Polymer Chemistry", Ithaca, N.Y., Cornell University Press, 1953, pp. 56 and 57.

Brydson, J. A., "Plastics Materials", Princeton, N. J., D. Van Nostrand, ©1966, pp. 33–42.

Billmeyer, Fred W., "Textbook of Polymer Science", Second Edition, New York, Wiley-Interscience, ©1971, pp. 120–126, 167–169, 207–209.

*Primary Examiner*—Philip Anderson

[57] ABSTRACT

A process of forming a surface covering having decorative effects is disclosed. The process comprises forming a foam comprising at least one polymer having at least a first phase region and a second phase region on a backing, heating the foam to the flow temperature of the first phase region of the foam, compressing the heated foam and cooling the foam while in the compressed shape, thus facilitating coating the surface of the foam which remains in the compressed shape, and reheating the foam to permit the compressed foam to return to substantially its precompressed shape.

6 Claims, 1 Drawing Figure

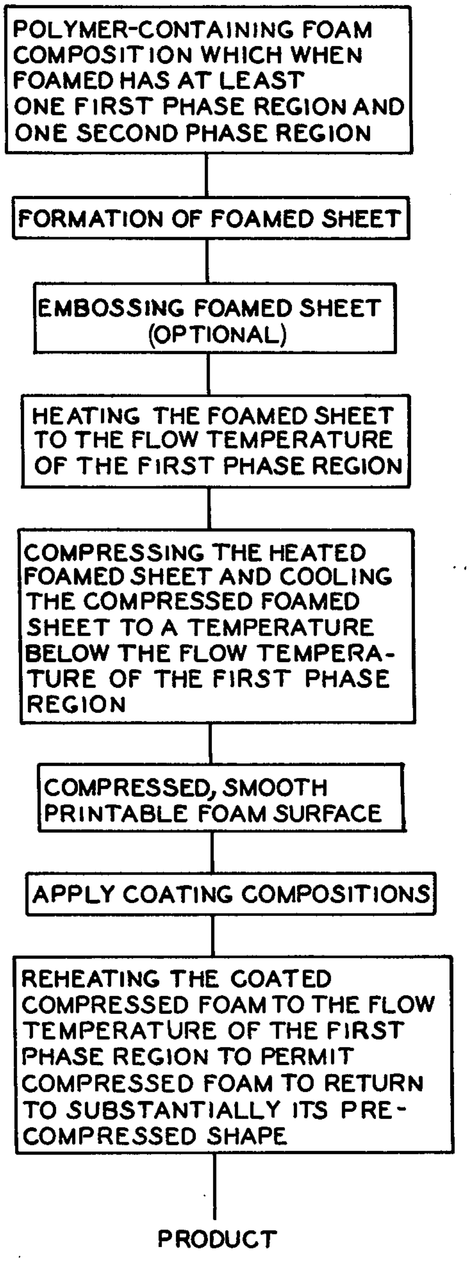
POLYMER-CONTAINING FOAM COMPOSITION WHICH WHEN FOAMED HAS AT LEAST ONE FIRST PHASE REGION AND ONE SECOND PHASE REGION
FORMATION OF FOAMED SHEET
EMBOSSING FOAMED SHEET (OPTIONAL)
HEATING THE FOAMED SHEET TO THE FLOW TEMPERATURE OF THE FIRST PHASE REGION
COMPRESSING THE HEATED FOAMED SHEET AND COOLING THE COMPRESSED FOAMED SHEET TO A TEMPERATURE BELOW THE FLOW TEMPERATURE OF THE FIRST PHASE REGION
COMPRESSED, SMOOTH PRINTABLE FOAM SURFACE
APPLY COATING COMPOSITIONS
REHEATING THE COATED COMPRESSED FOAM TO THE FLOW TEMPERATURE OF THE FIRST PHASE REGION TO PERMIT COMPRESSED FOAM TO RETURN TO SUBSTANTIALLY ITS PRE-COMPRESSED SHAPE
PRODUCT

PROCESS FOR FORMING A SURFACE COVERING HAVING DECORATIVE EFFECTS

This application is a continuation-in-part application of application Ser. No. 820,864 filed Aug. 1, 1977 now abandoned.

This invention relates to decorative surface coverings.

More specifically, this invention relates to a new process for forming decorative effects on floor coverings, wall coverings, and the like.

Various methods for the production of decorative floor and wall coverings are well known. Also well known in the floor covering art are the processing problems associated with these various methods. Accordingly, the flooring industry is continually searching for new methods for solving these processing problems. One processing problem relates to the difficulty in applying coatings, e.g., printing inks, wear layer compositions, etc., at production speeds to foam surfaces considered in the art to be unprintable, that is, to non-smooth foam surfaces, undulating foam surfaces, and especially to foam surfaces which have been embossed.

The present invention solves the above problem by providing a process for the production of decorative surface coverings, which process facilitates the application of coatings to non-smooth, undulating, or embossed foam surfaces.

According to this invention, there is provided a process of forming a surface covering having decorative effects which process comprises:

(a) depositing a mechanically frothed foam or forming a chemically blown foam on a backing, the foam comprising at least one polymer and having at least a first phase region and a second phase region, both phase regions existing at least in the surface region of the foam, (1) the first phase region exhibiting a flow temperature above room temperature and being present in the foam in an effective amount to hold the compressed shape of the foam in step (c) below, (2) the second phase region remaining elastomeric at the flow temperature of the first phase region;

(b) heating the foam to a temperature at least equal to the flow temperature of the first phase region;

(c) compressing the heated foam sufficient to form a smooth, printable foam surface and cooling the foam in the compressed shape to a temperature below the flow temperature of the first phase region such that the first phase region holds the compression of the foam upon removal of the compressing force thus providing a smooth, printable foam surface;

(d) applying at least one coating composition to at least a portion of the compressed, smooth, printable foam surface; and, (e) reheating the resulting coated, compressed foam to a temperature at least equal to the flow temperature of the first phase region to permit the compressed foam to return to substantially its precompressed shape.

As used herein, in relation to polymers, the term "flow temperature" is understood to mean that temperature at which flow occurs in the amorphous or crystalline phases of polymers. To provide further understanding relating to the temperature at which flow occurs in the amorphous or crystalline phases of polymers, reference is made to J. A. Brydson, *Plastic Materials,* 33–42 (1966), herein incorporated by reference.

As used herein, in relation to foams, the term "first phase region" is understood to mean all areas in a foam which exhibit the same flow temperature as defined above.

As used herein, in relation to foams, the term "second phase region" is understood to mean all areas in a foam, which areas do not exhibit a flow temperature but rather exhibit elasticity, that is, these areas when subjected to deformation or strain always tend to resume their original shape after the deforming force is removed.

In one embodiment of this invention, the polymer-containing foam is formed by the mechanical incorporaton of air (frothed) into the foam composition and the resulting mechanically-produced foam is deposited on a backing.

In another embodiment, the polymer-containing foam is produced by incorporating any art recognized blowing agent, e.g., azodicarbonamide, into the foam composition, depositing the composition on a backing and heating the composition to decompose the blowing agent, evolve a gas, thus forming a foam.

In the production of the polymer-containing foams suitable for use in this invention, any foamable polymer or polymer blend can be employed, provided that the resulting foam has at least a first and a second phase region, the first phase region exhibiting a flow temperature above room temperature and the second phase region remaining elastomeric at the flow temperature of the first phase region.

One method for determining usable polymers or polymer blends is to first prepare and sample foam of the selected material and then run a dynamic mechanical property analysis to obtain a graph of modulus versus temperature using, for example, a Model DV2 "Rheovibron" available from Toyo Measurement Industries, Inc. One skilled in art by studying the resulting graph will be able to determine if the selected foamed material comprises a region which exhibits a flow temperature above room temperature (first phase region) and a region which would remain elastomeric at the flow temperature of the first phase region (second phase region). Accordingly, by following the above method, one skilled in the art could readily determine whether a polymer or polymer blend is potentially useful in the practice of this invention.

Additionally, it is critical to the practice of this invention that the first phase region be present in the foam in an amount effective to hold the compressed shape of the foam upon removal of the compressive force. It is believed that the first phase region of the foam, when the foam is heated to or above the flow temperature of the first phase region, flows. Upon subsequent compressing and cooling below the flow temperature of the first phase region, the flow stops and the first phase region serves to lock or hold the compressed foam shape upon the removal of the compressive force. Accordingly, the only positive way known to determine whether a foamed polymer or polymer blend contains a sufficient amount of first phase region so as to be suitable for use in this invention is to heat the foam to or above the flow temperature of the first phase region, subject the heated foam to the compression and cooling step, remove the compressive force and observe the resulting compressed foam to see if the compressed shape is maintained.

Polymers or blends of polymers which have been found to be particularly suitable for use include polyvinyl chloride homopolymers; polyvinyl chloride copolymers; blends of polyvinyl chloride homopolymers and copolymers; blends of two styrene-butadiene rubber latexes, one SBR selected to provide a phase region exhibiting a flow temperature above room temperature and one SBR selected to provide a phase region which remains elastomeric at the flow temperature of the phase region of the other SBR; blends of two acrylic latexes selected in accordance with the above procedure for selecting SBR latexes; and blends of polyvinyl chloride polymers, acrylic latexes and SBR latexes, and the like.

The foam compositions of this invention can comprise various art known ingredients which are typically employed in the selected foam type, for example, the foam compositions can be formulated to include plasticizers for the polymer resins, heat and/or light stabilizers, surfactants, fillers and the like. The examples of this invention further illustrate the employment of these typical art known ingredients employed in art recognized amounts.

To prepare a decorative surface covering according to this invention, a foam as described above is formed to any desired thickness on any backing conventionally used in the industry using any conventional method of foam application, for example, a blade over roll or reverse roll applicator. The foam surface at this point is generally not smooth, that is, the surface of the foam is not considered printable. Although the benefit to be derived from the use of this invention is greatest in relation to non-smooth, unprintable foam surfaces, if one so desires, this invention is also applicable to foam surfaces which are smooth and printable at formation. For example, the invention is applicable for use on a foam surface which is smooth and printable at formation but which is subjected to an embossing operation prior to any surface coating application.

Optionally, at this point, the foam can be embossed using any conventional embossing method. For example, if the foam is uncured, it can be embossed using a mechanical embossing roll prior to curing the foam. Alternatively, if the foam is cured first, it can be embossed, including print embossed, using, for example, one of the methods set forth in U.S. Pat. Nos. 3,070,476 and 3,655,312 herein incorporated by reference.

The foam is then heated, using any conventional method, to a temperature at least equal to the flow temperature of the first phase region. If, as a result of one of the above process steps, e.g., the foam curing step, the foam temperature is above the flow temperature of the first phase foam, further heating is not necessary and one can proceed to the compressing and cooling step.

Next, the foam is compressed to a higher density to provide a smooth, printable surface and cooled in the compressed shape to a temperature below the flow temperature of the first phase region. Any conventional compressing and cooling method can be employed. A particularly suitable apparatus for use is a smooth surface, steel roll laminator equipped with a water circulating cooling system.

The resulting compressed foam exhibits a surface which is now smooth and printable, the smooth surface resulting from, for example, compressing a non-smooth or undulating foam surface or from compressing a smooth or non-smooth surface which has been embossed.

At this point, the smooth, printable foam surface can be easily coated with any conventional coating using any conventional method of application. For example, a decorative design using an ink composition can be rotogravure printed on the surface and, in addition to printing ink compositions, the entire surface can be subsequently clear coated with an art known wear layer composition, which typically comprises a poly(vinyl chloride) plastisol.

It will now be evident to one skilled in the art from the above description that, if the foam surface has been embossed prior to the compression and cooling step, the ink compositions can be printed in-register with the embossing using conventional and well known methods rather than requiring the prior art method of embossing in-register with printing.

The resulting coated, compressed foam surface is then subjected to reheating to a temperature at least equal to the flow temperature of said first phase region to permit the compressed foam surface to return to substantially its precompressed shape. To avoid a second heating to cure the wear layer composition (if employed), the reheating temperature is selected to achieve both functions.

Upon cooling, the resulting product is recoverable as a surface covering having decorative effects.

The present invention will be more easily understood by referring to the drawing which is a flow diagram illustrating the process and various embodiments of the present invention.

Having described the materials and methods of the invention, reference is now made to the following examples which set forth the best mode contemplated for practicing the invention.

EXAMPLE I

This example demonstrates the preparation of a decorative surface covering of this invention using a polyvinyl chloride plastisol foam. The foam composition employed the following materials:

| Materials | Parts per 100 Parts of Resin |
|---|---|
| polyvinyl chloride resin (dispersion grade Mn 37.600) | 65 |
| polyvinyl chloride resin (blending grade Mn 36.500) | 35 |
| di-2-ethylhexyl phthalate | 70 |
| dibutyltin dilaurate | 3 |
| "DC 1252" Silicone Surfactant (Dow Corning Corp.) | 6 |

The total amounts of the above materials were placed in an Oakes foamer and mechanically frothed.

The resulting frothed foam was deposited on a beater saturated asbestos backing to a thickness of about 0.05 inch using a knife applicator.

The backing having the foam deposited thereon was then heated to a temperature of about 275° F. for a period of about 15 minutes, tested and found to have a foam density of about 24 lbs/ft$^3$.

The heated foam was then compressed in a flat bed press at a temperature of about 300° F. and cooled while in the compressed shape to a temperature of about 100° F. before disengaging the press.

The resulting compressed foam was tested and found to have a foam density of about 55 lbs/ft$^3$ and observed to have a uniformly compressed, smooth, printable surface.

Next, the printable surface was rotogravure printed with an ink composition and thereafter clear coated with a PVC plastisol wear layer composition.

The coated, compressed foam was then reheated to a temperature of about 380° F. for a period of about 2 minutes to permit the compressed foam surface to return to substantially its precompressed shape and density and cure the wear layer composition.

The resulting product was recovered as a decorative floor covering, observed to have an excellent print image and found to have a foam density of about 24 lbs/ft$^3$.

EXAMPLE II

This example demonstrates the preparation of a decorative surface covering of this invention using a foamed blend of two SBR latexes. The foam composition employed the following materials:

| Materials | Parts per 100 Parts of Resin |
|---|---|
| styrene-butadiene latex (designated "PL-730" available from Polysar Ltd., 31% styrene, 69% butadiene) | 80.00 |
| carboxylated SBR latex (designated "PL-776" available from Polysar Ltd., 77% styrene, 21% butadiene, 2% carboxyl group content) | 20.00 |
| potassium oleate | 2.50 |
| alumina trihydrate (325 mesh) | 100.00 |
| sulfur | 0.25 |
| tetramethylthiuram disulfide | 2.00 |
| zinc oxide | 1.25 |
| zinc diethyldithiocarbamate | 1.00 |
| thiocarbanilide | 1.30 |
| antioxidant (designated "Wingstay-L" available from Goodyear Tire and Rubber Co.) | 0.75 |
| ammonium acetate | 3.00 |
| "Trimene Base" available from Uniroyal Chemical | 1.00 |

The total amount of the above materials was placed in an Oakes foamer and mechanically frothed. A dynamic mechanical analysis was run on the frothed foam, and the analysis indicated a first phase region having a flow temperature within the range of from about 122° F. to about 140° F. and a second phase region which is elastomeric at that flow temperature range.

The resulting foam was deposited on a beater saturated asbestos backing to a thickness of about 0.05 inch using a knife applicator.

The backing having the foam thereon was heated to a temperature of about 225° F. in a hot air oven for a period of about 3 minutes to gel the SBR foam.

Next, the gelled SBR foam was embossed using a mechanical embossing roll.

The embossed foam was then heated to a temperature of about 350° F. for a period of about 5 minutes and cooled to room temperature producing a cured SBR foam which was tested and found to have a foam density of about 20 lbs/ft$^3$ in the non-embossed portions.

The embossed foam was then heated to a temperature of about 250° F., compressed at that temperature, and cooled in the compressed shape using a smooth steel laminating roll which was water cooled to about 45° F. The resulting compressed foam was found to have a temperature of about 100° F. upon exiting the laminating roll.

The resulting compressed foam surface was observed to be smooth and printable with no apparent embossed effect.

The smooth, printable surface was then selectively printed using an ink composition applied using a rotogravure printer.

The resulting printed surface, still compressed, was coated with a clear coat (PVC plastisol) using a conventional applicator.

The resulting coated, compressed foam was reheated to a temperature of about 400° F. for about 3 minutes, which served to cure the wear layer and permitted the compressed foam to return to substantially its precompressed embossed shape and density.

The resulting product was recovered as a printed, embossed floor covering and observed to have an excellent print image. The foam in the non-embossed area was tested and found to have a density of about 20 lbs/ft$^3$.

EXAMPLE III

The example demonstrates the preparation of a decorative surface covering of this invention using a foamed blend of an SBR latex and a polyvinyl chloride latex. The foam composition employed the following materials:

| Materials | Parts per 100 Parts of Resin |
|---|---|
| "PL-730" (described in Example II) | 80.00 |
| polyvinyl chloride latex ("Geon 151" available from B. F. Goodrich) | 20.00 |
| disodium N-octadecyl sulfosuccinate | 2.00 |
| alumina trihydrate (325 mesh) | 10.00 |
| sodium lauryl sulfate | 2.00 |
| sulfur | 1.63 |
| zinc oxide | 0.83 |
| zinc diethyldithiocarbamate | 1.00 |
| zinc merceptobenzothiazole | 1.00 |
| antioxidant ("Wingstay L") | 0.75 |
| antioxidant ("Amenox" available from Uniroyal Chemical) | 0.25 |

The total amount of the above material was placed in an Oakes foamer and mechanically frothed. A dynamic mechanically analysis was run on the frothed foam, and the analysis indicated a first phase region having a flow temperature within the range of from about 149° F. to about 167° F. and a second phase region which is elastomeric at that flow temperature.

The resulting foam was deposited on a beater saturated asbestos backing to a thickness of about 0.05 inch using a knife applicator.

The backing having the foam thereon was heated to a temperature of about 300° F. in a hot air oven for a period of about 10 minutes to cure the foam which was tested and found to have a density of about 18 lbs/ft$^3$.

The cured foam at a temperature of about 300° F. was then compressed in a flat bed press and cooled while in the compressed shape to a temperature of about 100° F. before the press was disengaged. The resulting compressed foam was tested and found to have a density of about 45 lbs/ft$^3$ and observed to have a uniformly compressed, smooth, printable surface.

Next, the surface was rotogravure printed with a printing ink and subsequently clear coated with a PVC plastisol wear layer composition.

The coated, compressed foam was reheated to a temperature of about 300° F. for a period of about 5 minutes to permit the compressed foam to return to its precompressed shape and density and to cure the wear layer composition.

The resulting product was recovered as a decorative floor covering, observed to have excellent print image and found to have a foam density of about 18 lbs/ft$^3$.

EXAMPLE IV

This example demonstrates the preparation of a decorative surface covering of this invention using a foamed blend of two acrylic latexes. The foam composition employed the following materials:

| Materials | Parts per 100 Parts of Resin |
|---|---|
| self-crosslinking acrylic latex (designated "E-484" commercially available from Rohm & Haas) | 80.0 |
| polymethylmetacrylate latex (designated "Rhoplex B-85" commercially available from Rohm & Haas) | 20.0 |
| surfactant (designated "Triton X-405" commercially available from Rohm & Haas) | 2.0 |
| alumina trihydrate (325 mesh) | 55.0 |
| oxalic acid | 2.0 |
| sodium lauryl sulfate | 4.0 |
| cellulosic thickening agent (designated "Cellosize QP-4400" commercially available from Union Carbide Corp.) | 0.2 |
| melamine/formaldehyde resin (designated "Cymel 385" commercially available from Union Carbide) | 8.0 |

The total amount of the above materials was placed in an Oakes foamer and mechanically frothed. A dynamic mechanical analysis was run on the frothed foam, and the analysis indicated a first phase region having a flow temperature within the range of from about 115° F. to about 144° F. and a second phase region which is elastomeric at that flow temperature.

The resulting foam was deposited on a beater saturated asbestos backing to a thickness of about 0.05 inch using a knife applicator.

The backing having the foam thereon was heated for about 5 minutes to a temperature of about 275° F. and then to a temperature of 380° F. for about 3 minutes. The resulting cured foam was tested and found to have a density of about 20 lbs/ft$^3$.

The cured foam at a temperature of about 300° F. was then compressed in a flat bed press and cooled while in the compressed shape to a temperature of about 100° F. before disengaging the press. The resulting compressed foam was tested and found to have a density of about 42 lbs/ft$^3$ and observed to have a uniformly compressed, smooth, printable surface.

Next, the surface was rotogravure printed with a printing ink and subsequently clear coated with a PVC plastisol wear layer composition.

The coated, compressed foams was reheated to a temperature of about 320° F. for a period of about 3 minutes to permit the compressed foam to return to substantially its precompressed shape and density and to cure the wear layer composition.

The resulting product was recovered as a decorative floor covering, observed to have an excellent print image and found to have a foam density of about 20 lbs/ft$^3$.

It will be evident from the foregoing that various modifications can be made to the present invention. Such, however, are considered as being within the scope of this invention.

What is claimed is:

1. A process of forming a surface covering having decorative effects which process comprises:

(a) depositing a mechanically frothed foam or forming a chemically blown foam on a backing, said foam comprising at least one polymer or a blend of polymers, said polymer or blend of polymers having at least a first phase region and a second phase region, both phase regions existing at least in the surface region of said foam, (1) flow occurring in said first phase region at a temperature above room temperature and said first phase region serving to hold the compressed shape of the foam in compression step (d) below.

(2) said second phase region remaining elastomeric at the temperature at which said first phase region flows;

(b) curing or fusing the foam on the backing;

(c) compressing the resulting cured or fused foam, at a temperature sufficient to cause flow to occur in said first phase region, in order to form a smooth, printable foam surface and cooling the foam in the compressed shape to a temperature below the temperature at which flow occurs in said first phase region;

(d) removing the compressing force whereby the first phase region serves to hold the compression, thus providing a smooth, printable foam surface;

(e) applying at least one coating composition to at least a portion of the compressed, smooth, printable foam surface; and, (f) reheating the resulting coated, compressed foam to a temperature at least equal to the temperature at which flow occurs in said first phase region to permit the compressed foam to return to substantially its precompressed shape.

2. The process of claim 1 which comprises applying a printing ink coating composition to at least a portion of the compressed, smooth, printable foam surface followed by the application of a wear layer coating composition.

3. The process of claim 1 also comprising the step of embossing said foam prior to curing or fusing the foam on the backing.

4. The process of claim 3 in which said at least one coating composition is a printing ink composition.

5. The process of claim 4 in which said printing ink composition is printed in-register with said embossing.

6. The process of claim 1 also comprising the step of embossing said foam after curing or fusing the foam on the backing and before compressing the cured foam.

* * * * *